July 11, 1961  P. G. SIEBERT ET AL  2,992,049
SPLIT BEARING-HANGER
Filed Aug. 19, 1960
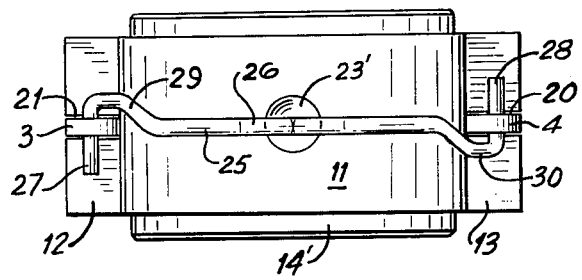
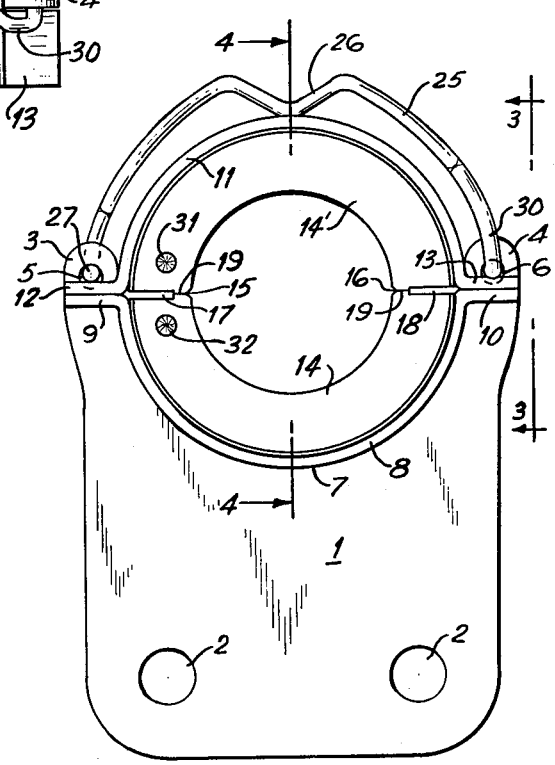
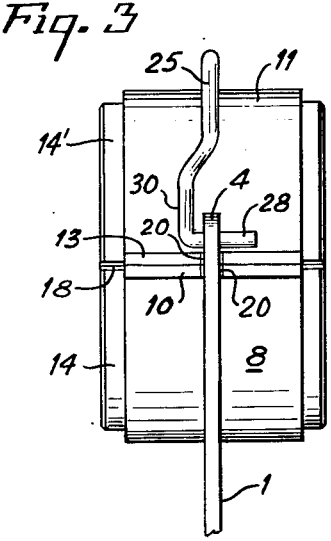
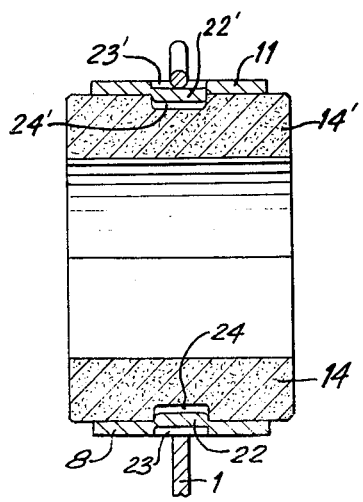
INVENTORS.
PRESTON G. SIEBERT
MARTIN SCOTT
BY
Bierman + Bierman
ATTORNEYS _United States Patent Office_

2,992,049
Patented July 11, 1961

2,992,049
SPLIT BEARING-HANGER
Preston G. Siebert, Ossining, and Martin Scott, Valhalla, N.Y., assignors to Metallized Carbon Products Corp., Ossining, N.Y., a corporation of New York
Filed Aug. 19, 1960, Ser. No. 50,750
10 Claims. (Cl. 308—27)

The present invention is directed to structures of bearings and hangers and more particularly to an improved form thereof.

In many installations requiring bearings, there are relatively long shafts having a number of bearings located thereon at spaced intervals. Such bearings in time wear and it becomes necessary to replace the same. With bearings previously used, it was necessary to disassemble a number of elements in order to be able to remove the bearing and replace it.

In copending application Serial No. 803,407, filed April 1, 1959, in the name of Preston G. Siebert and entitled "Bearing and Shroud Combination," there is described a structure of bearing and shroud wherein the bearing is split along a diameter. This structure embodies a transversely split shroud which may be separated to expose the bearing, which may then be removed from the shaft since the bearing is split diametrically. Such a structure has been found quite suitable for the desired purpose since it eliminates the necessity of dismantling elements attached to the shaft. However, in certain locations there is insufficient space to enable the shroud to be slipped longitudinally of the shaft and still leave room for pulling out the old bearing for replacement.

The present invention is intended to overcome this difficulty, it being among the objects thereof to provide a combination of bearing and hanger wherein the replacement of a bearing does not require any substantial amount of space along the shaft.

It is also among the objects of the present invention to provide a structure of the type described, which is simple, relatively inexpensive and which does not require special tools for the removal or replacement of the bearing from the shroud or shaft.

In practicing the present invention, there is provided the usual bracket which is mounted on a fixed portion of the apparatus. The bracket has a recess which is about semi-circular in form and a pair of perforated ears constituting an extension of the bracket above the recess. There is further provided a shroud which is split longitudinally along a diameter and is provided with outwardly extending flanges which are in alinement. The shroud fits into the recess with the ears of the bracket extending through slots in the flanges. A spring wire or similar holding means contacts the top of the shroud and the ends thereof are inserted into the perforations of the ears to hold the shroud and bearing in position.

In the accompanying drawing constituting a part hereof, in which like reference characters indicate like parts, FIG. 1 is a top plan view of a combination of bearing and hanger made in accordance with the present invention;

FIG. 2 is a front elevational view thereof;

FIG. 3 is a side elevational view with part of the bracket broken away, and

FIG. 4 is a longitudinal cross-sectional view taken along line 4—4 of FIG. 2.

The structure includes a bracket 1 which is generally a flat plate and has a pair of openings 2 at one end thereof constituting means for attaching the bracket to a suitable support by means of bolts, screws, rivets or the like. At the opposite end of the bracket are a pair of ears 3 and 4 having openings 5 and 6, respectively, therein. A semi-circular recess 7 is provided between the ears, the diameter thereof being slightly larger than the outside diameter of the shroud.

Semi-circular portion 8 of the shroud has outwardly extending flanges 9 and 10. Complementary semi-circular shroud 11 has outwardly extending flanges 12 and 13 which cooperate with flanges 9 and 10, respectively, being in contact therewith.

The bearing itself which is held within the shroud, consists of two semi-circular members 14 and 14'. Longitudinal scorings 15 and 16 placed diametrically opposite each other form means for splitting the bearing. Slots 17 and 18 in alinement with each other and with scorings 15 and 16 are provided along opposite sides of the bearing. A moderate force is sufficient to split the bearing along lines 19.

Transverse slots 20 are formed in flanges 6 and 10 and similar transverse slots 21 are formed in flanges 9 and 12. Ears 3 and 4 are adapted to pass through said slots as shown more particularly in FIG. 1.

At about midway of shroud 8 there is formed an inwardly extending circular stud 22 providing a dent 23. A recessed portion 24 is formed in bearing 14 for the reception of stud 22 to anchor the bearing in the shroud to prevent rotation thereof during rotation of the shaft. In a similar manner, a stud 22' is formed in shroud 11, producing a dent 23' in the outer surface thereof. A corresponding depression 24' is formed in bearing 14'. Studs 22 and 22' and associated elements are diametrically opposite each other.

Spring wire 25 generally of semi-circular form, has a V-shaped deformed portion 26 which is adapted to fit into dent 23' of shroud 11. The ends of spring 25 are bent transversely at 27 and 28 in opposite directions, as shown in FIG. 1, and are inserted into openings 5 and 6. Offset portions 29 and 30 adjacent to ends 27 and 28, respectively, permit the angular portion 26 to rest firmly in dent 23'.

The pressure of spring 25 holds shrouds 8 and 11 in fixed relation to each other and consequently firmly holds bearing members 14 and 14'. Slots 20 and 21 are slightly wider than the width of ears 3 and 4 and the diameter of recess 7 is slightly greater than that of shroud 8. Thereby the bearing and shroud combination have a limited movement relative to the bracket. Thereby the bearing becomes self-alining even though it is firmly held in the bracket for operative purposes. Shroud 8 and bearing 14 are identical with shroud 11 and bearing 14' whereby they may be reversed in position on the bracket. This facilitates assembly of the structure and replacement of the bearing.

In operation, assuming that the assembly as shown in FIG. 2 is in position on a piece of apparatus and the bearing has become worn and is to be replaced, the operator will remove wire 25 from ears 3 and 4. This frees the combination of shroud and bearing, which may be lifted off of the ears either as a unit or in several parts as the operator chooses. The elements of the shroud are separated and the old worn bearing removed. A new split bearing may now be assembled within shroud 8. Since split 19 is irregular in shape, it is important that the two halves of the bearing match perfectly. This is accomplished by providing small circular depressions 31 and 32 at one edge only on one side of each bearing part so that the operator will see to it that these depressions match when assembling the bearing. The assembled bearing and shroud are then slipped over ears 3 and 4 and spring 25 inserted in place. This operation may be accomplished without special tools and in a very confined space without detracting from the speed or efficiency of the operator.

We claim:

1. A bearing-hanger structure comprising a bracket, a recess at one end thereof, a pair of perforated ears at said end, a substantially cylindrical shroud having a bearing therein, flanges on opposite sides of said shroud, said flanges being in alinement, said shroud fitted into said recess, alined slots in said flanges, said ears extending through said slots, the perforations in said ears being at the face of said flanges nearest said end, and means passing through said ears to retain said shroud on said bracket.

2. A bearing-hanger structure according to claim 1 characterized in that said shroud comprises two semicircular parts each of which has opposed flanges fitted together.

3. A bearing-hanger structure according to claim 1 characterized in that said slots are wider than the thickness of said ears to permit movement of said shroud relative to said bracket.

4. A bearing-hanger structure according to claim 1 characterized in that said bearing in split in the plane of said flanges.

5. A bearing-hanger structure according to claim 1 characterized in that cooperating means are provided on said shroud and said bearing to prevent relative movement thereof.

6. A bearing-hanger structure according to claim 1 characterized in that cooperating means are provided on said shroud and said bearing to prevent relative movement thereof comprising at least one inwardly projecting stud on said shroud and a corresponding depression in said bearing.

7. A bearing-hanger structure according to claim 1 characterized in that said retaining means is a wire the ends of which enter said ears and the central part thereof contacts said shroud.

8. A bearing-hanger structure according to claim 1 characterized in that said retaining means is a wire the ends of which enter said ears and the central part thereof contacts said shroud, said shroud having an indentation and said contact of said wire is in said indentation.

9. A bearing-hanger structure according to claim 2 characterized in that each of said parts has an inwardly projecting stud and said bearing has a depression into which said studs fit.

10. A bearing-hanger structure according to claim 2 characterized in that each of said parts has an inwardly projecting stud and said bearing has a depression into which said studs fit, said bearing being split in the plane of said flanges.

References Cited in the file of this patent

UNITED STATES PATENTS

| | | |
|---|---|---|
| 2,371,400 | Mantle | Mar. 13, 1945 |
| 2,484,725 | Parker | Oct. 11, 1949 |
| 2,819,932 | Walker | Jan. 14, 1958 |
| 2,827,340 | Johnson | Mar. 18, 1958 |
| 2,868,594 | Leister | Jan. 13, 1959 |
| 2,897,025 | Nickerson | July 28, 1959 |

FOREIGN PATENTS

| | | |
|---|---|---|
| 698,002 | Germany | Oct. 30, 1940 |

OTHER REFERENCES

Publication, Service Manual, published by Willys Motors, Inc., Toledo, Ohio, 1937, 3 ed.